US006961692B1

(12) United States Patent
Polanyi et al.

(10) Patent No.: US 6,961,692 B1
(45) Date of Patent: Nov. 1, 2005

(54) SYSTEM AND METHOD FOR WRITING ANALYSIS USING THE LINGUISTIC DISCOURSE MODEL

(75) Inventors: Livia Polanyi, Palo Alto, CA (US); Martin Henk Van Den Berg, Palo Alto, CA (US)

(73) Assignee: Fuji Xerox Co, Ltd., Tokyo (JP)

( * ) Notice: Subject to any disclaimer, the term of this patent is extended or adjusted under 35 U.S.C. 154(b) by 969 days.

(21) Appl. No.: 09/630,371

(22) Filed: Aug. 1, 2000

(51) Int. Cl.[7] ......................... G06F 17/20; G06F 17/27
(52) U.S. Cl. ................................. 704/9; 704/1; 704/8
(58) Field of Search .................................... 704/9, 8, 1

(56) References Cited

U.S. PATENT DOCUMENTS

| 5,708,822 A | * | 1/1998 | Wical | 704/1 |
| 6,112,168 A | * | 8/2000 | Corston et al. | 704/9 |
| 2002/0042707 A1 | * | 4/2002 | Zhao et al. | 704/9 |
| 2002/0046018 A1 | * | 4/2002 | Marcu et al. | 704/9 |

OTHER PUBLICATIONS

"A formal model of the structure of discourse", Journal of Pragmatics, vol. 12, Issues 5-6, Dec. 1988, pp. 601-638, Livia Polanyi.*
Livia Polanyi and Martin H. van den Berg. Discourse structure and discourse interpretation. In P. Dekker and M. Stokhof, editors, Proceedings of the Tenth Amsterdam Colloquium, pp. 113-131. Department of Philosophy, University of Amsterdam, 1996.*
Mann et al., "Rhetorical Structure Theory: A Theory of Text Organization", University of Southern California, Information Sciences Institute, Jun. 1987, NTIS Identifying Number ADA 183038.*
Mani, *Machine Learning of Generic and User-Focused Summarization*, 1998.

Barzilay et al., *Using Lexical Chains for Text Summarization*, 1997, p. 10-17.
Polanyi et al., *A Syntactic Approach to Discourse Semantics*, 1984, p. 413-19.
Polanyi et al., *On the Recursive Structure of Discourse*, 1983, p. 141-178.
Eastgate Corp., *Storyspece: A Hypertext Tool for Writers and Readers* p. 1-7 www.eastgate.com/storyspace/StoryspaceOV.html printed on Jun. 12, 2000.
Mani et al., *Multi-Document Summarization By Graph Search and Matching* 1997, p. 622-628.
Marcu *Discourse trees are good indicators of importance in text* 1999, p. 123-136.
Polanyi *The Linguistic Discourse Model: Towards a Formal Theory of Discourse Structure* Nov. 1986 152 p.
Marcu *The Rhetorical Parsing of Natural Language Texts* Jul. 1997, p 96-103.
Hovey et al., *Automated Text Summarization in Summarist* Aug. 8, 1997.
Polanyi *The Linguistic Structure of Discourse*, Technical Report Center for the Study of Language and Information, Standford University, Nov. 1996 p 3-26.

* cited by examiner

*Primary Examiner*—David L. Ometz
*Assistant Examiner*—Brian Albertalli
(74) *Attorney, Agent, or Firm*—Oliff & Berridge, PLC

(57) ABSTRACT

A technique for writing analysis using the theory of discourse that categorizes text into content, operator and modifier text building units and provides for relating the categorized text building units together using coordination, subordination and binary relationships. A graphical representation of the discourse can be shown since the structural representation of discourse created by the interrelationships can be easily displayed. The analysis and graphical visualization of the writing structure of texts helps writers to analyze and compare writings.

25 Claims, 3 Drawing Sheets

Linguistic Discourse Model Analyzer 100

SYSTEM AND METHOD FOR WRITING ANALYSIS USING THE LINGUISTIC DISCOURSE MODEL

BACKGROUND OF THE INVENTION

1. Field of Invention

This invention is related to the analysis of the content of a written work.

2. Description of Related Art

Current writing analysis involves human writer review processes. These processes include a writer, an instructor, an editor and/or one or more peers who review a written work. These processes can also be computer enhanced by enabling the review process to take place over a computer network, via, for example, email. Alternatively, the review process can take place in computer-enhanced, collaborative review environments, in which participants critique the written work.

SUMMARY OF THE INVENTION

These writing analysis processes suffer from a number of problems. In writing workshops, the instructor reviews the text from the perspective of the target audience. The instructor provides feedback on problematic language. The instructor often indicates a sentence is incorrect but usually does not provide a microanalysis of the text explaining precisely why the text is incorrect.

In fact, reviewers tend to focus on two levels of structure in the review. Since reviewers feel comfortable with grammar checking, the reviewers might perform grammar checking for the entire text. Less frequently, vague or ambiguous sentences may be identified. However, reviewers usually do not explain why a sentence is vague, ambiguous or otherwise objectionable. The location of the problem is identified and the user is expected to understand how to correct the problem.

A second problem stems from the stylistic preferences of each reviewer. A reviewer's subjective style preferences will in turn affect a reviewer's critique of the written work. Thus, instead of receiving an objective indication of how well the work communicated the desired information to the reader, the reviewer may focus on subjective stylistic preferences.

Further, the sheer volume of material to be reviewed tends to force a reviewer to focus on relatively easier problems. For example, overall organization of the text may be critiqued with only the occasional exemplary sentence construction analyzed in detail.

Outlining tools, such as the "outline view" in the Microsoft Word® word processor application, as well as Xerox Corporation's "Notecards" and EastGate Corporation's "StorySpace" tools, help the writer frame higher level concepts and issues. The writer may then concentrate on developing each of the ideas within a framework. However, these tools do not address the structure and organization of the text below the concept and topic level. Since these tools do not support analyzing how the units of meaning interrelate, they cannot be used to show the writer how to improve the text below the concept and issue level.

Grammar checking tools, such as "Grammatick II" and the grammar tool in Microsoft Word®, apply statistical formulas to a selected text to determine readability based on a variety of different formulae, such as the Flesch Reading Ease Index or the Flesch-Kincaid Grade Level index. These tools also provide sets of rules that can be applied to a written text to identify run-on sentences, sentence fragments, archaic expressions and gender-specific expressions. However, these tools merely indicate whether a text satisfies the rules. Though these tools may provide suggestions for improving a text based on the identified rule violations, these tools do not provide a structural representation of the text. Therefore, these tools cannot show the user how to improve the relationships of meaning between the units of text.

Text analysis tools, as described in Marcu, "The Rhetorical parsing of natural language texts," Proceedings of the $35^{th}$ Annual Meeting of the Association for Computational Linguistics and the $8^{th}$ Conference of the European Chapter of the Association for Computational Linguistics, Madrid, July, 1997, 96–103, can provide a structural representation of a text based on an analytic framework. The system described in Marcu, for example, is directed to the analysis of texts for the purpose of improved discourse-level automatic Natural Language processing. It is not directed to improving the structure or style of the text or to educate the writer in how to improve the organization of future written works that might be produced.

The Rhetorical Structures Theory disclosed in Marcu is a highly complex theory. The basic units of analysis have never been articulated clearly. Furthermore, there are several variations of Rhetorical Structures Theory that differ from one another in the basic relations between units that they employ. The relations themselves are very complex, overlapping and ambiguous. For example, classical Rhetorical Structures Theory, as developed by Mann and Thompson (1988), includes at least ten presentational relations, five multinuclear relations and fifteen subject matter relations. Training coders is a very lengthy task, requiring weeks of intensive study and supervision. Strong differences of opinion arise among experienced coders about the relationships which link units together. Intercoder reliability is very low. Depending on the level of analysis chosen by different coders, quite different structural trees labeled with Rhetorical Structures relations may be built. Therefore, different Rhetorical Structures Theory analyzers may produce significantly different structural representations of the same text. These factors taken together pose particular problems when attempting to apply Rhetorical Structures Theory in a learning environment where the goal is to help students improve their written communicative skills by applied text micro-analysis.

The Summarist system, as discussed by Hovy and Lin, "Automated Text Summarization in SUMMARIST" in Proceedings of the Workshop of Intelligent Scaleable Text Summarization, July 1997, uses statistical techniques, along with symbolic world knowledge of word meaning based on dictionaries, in attempting to discern a writer's intent. The Summarist system uses statistical techniques to identify important keywords producing topical keyword summaries.

Thus, these conventional natural language processing systems attempt to identify intended meaning in a text corpus. These systems do not exploit linguistic constraint information provided in the text, but instead rely on statistical analysis and word frequency counts. A determination is made from this statistical information as to the information the author intended to convey. This information is then used to facilitate queries.

The conventional systems described above do not provide a micro analysis of the text. They also fail to show the user why the text is incorrect or to provide a basis for determining how to fix the text. Such a microanalytic system would be a valuable tool. Systems and methods that allow a user to analyze any text while achieving high intercoder reliability would also be desirable. Such a system should also show users how to improve the relationships of meaning between the units of text and should allow the written text to be visualized.

This invention provides systems and methods for analyzing writing using the Linguistic Discourse Model theory of discourse analysis.

The systems and methods according to this invention provide high interceder reliability and are easily taught and understood. Furthermore, the systems and methods according to this invention provide a vehicle that allows a writer to improve text organization and structure in many different applications. This invention provides for analyzing a text using the Linguistic Discourse Model. The systems and methods according to this invention also provide for visualizing writing genres and specific documents. In particular, the systems and methods according to this invention can be integrated into computer-mediated writing teaching tools, such as the tools disclosed in co-pending U.S. patent application Ser. No. 09/609,325, herein incorporated by reference in its entirety.

BRIEF DESCRIPTION OF THE DRAWINGS

The invention will be described with reference to the accompanying drawings, in which like elements are labeled with like numbers, and which.

DETAILED DESCRIPTION OF EXEMPLARY EMBODIMENTS

Figure 1:
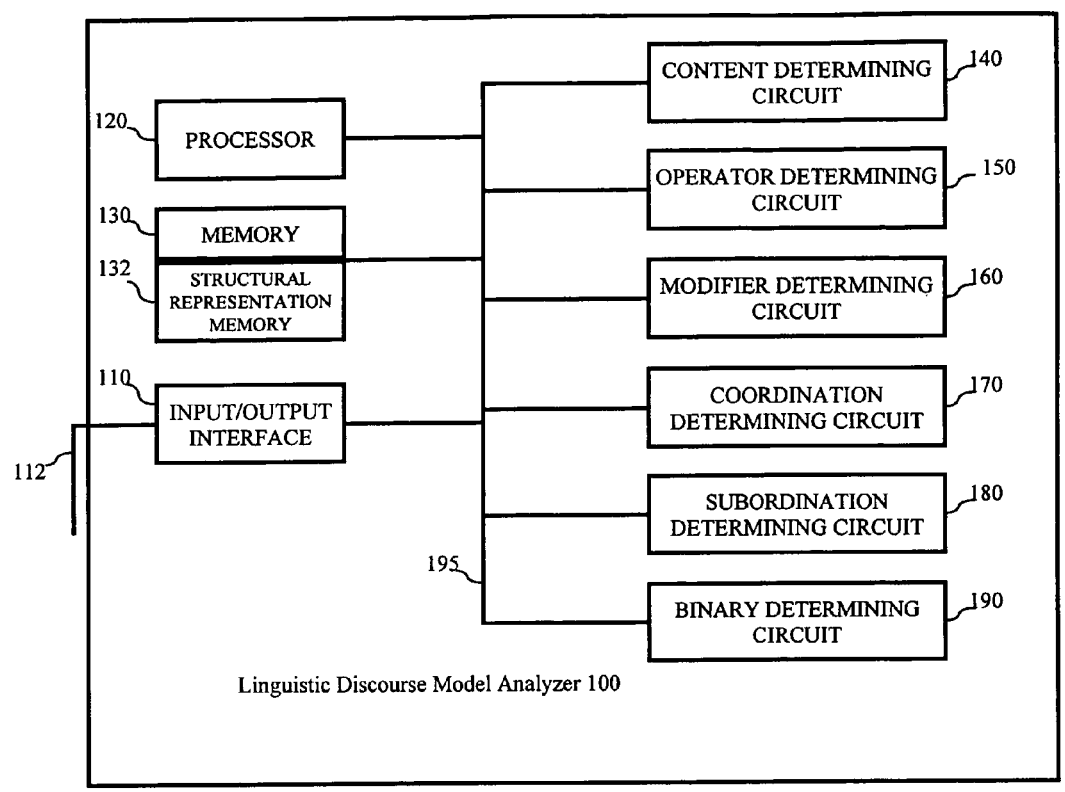
FIG. 1 is a block diagram of one exemplary embodiment of a system according to this invention.

FIG. 1 is a block diagram of one exemplary embodiment of a system 100 that analyzes a written work based on the Linguistic Discourse Model. A text is analyzed according to the Linguistic Discourse Model using the Linguistic Discourse Model Analyzer 100. The Linguistic Discourse Model Analyzer 100 comprises an input/output interface 110, a processor 120, a memory 130, a text building unit content determining circuit 140, an operator determining circuit 150, a modifier determining circuit 160, a relation coordination determining circuit 170, a subordination determining circuit 180 and binary determining circuit 190, all of which are connected via a data communication link 195. As shown in FIG. 1, the memory 130 includes a structural representation memory 132. The input/output interface 110 is also connected to an external communication link 112. The communication links 112 and 195 can each be any type of communication link, including a data/control bus, fiber optic, wireless, local area network, wide area network or any other known or later developed communication link. Any type of communication link now in existence or developed in the future may be used.

A user creates a written text using any method of text input, such as voice input, an editing program such as the UNIX editor vi, EMACS or the Microsoft word processing editor Word®, or the like. A text may be any written work including but not limited to ASCII text files, word processing files, web pages such as HTML, XML including any now known or later developed methods for representing text may be analyzed using the system and methods of this invention. The text may be loaded via the communications link 112 through the input/output interface 110 into memory 130.

The text is then segmented into discrete text building units reflecting the smallest packaging of meaning in a sentence. There may be several text building units in a sentence or there may be just one. Incomplete sentences may also be handled by the Linguistic Discourse Writing Model Analyzer 100, such as dates, exclamations, sentence fragments, and titles. The Linguistic Discourse Model, unlike other theories, does not require well formed and complete sentences to function properly. Further discussion concerning the packaging of meaning in sentences may be found in "The Linguistic Discourse Structure of Discourse" Technical Report, Center for the Study of Language and Information, Stanford University, November, 1996.

Once the text is loaded into the memory 130, one of the text building unit type determination circuits 140–160 is activated. In one exemplary embodiment for each text building unit, the content determining circuit 140 is activated to determine if the current text building unit is a content text building unit. For discussion purposes, the type determining circuits are described in an order. However, it will be apparent that text building unit type determination may occur in any order or may occur in parallel. Content text building units have a verb at their core, whether expressed or unexpressed. Content text building units express some state, action or belief that is an accomplishment or property of some entity. For example, in the phrase, "John is my friend", the property of being a friend is ascribed to John. Therefore the phrase is a content text building unit. In the phrase, "John ran to the fire station at the corner", John's action of running is clear. In the phrase, "John believes in something", John's belief is expressed, indicating this is a content building unit. In the phrase, "John believes Mary ran to the fire station at the comer", the phrase "John believes" is one content text building unit while "Mary ran to the fire station at the comer" is a second content text building unit.

If the current text building unit is not a content text building, unit then the operator determining circuit 150 is activated to determine if the current text building unit is an operator text building unit. Operator text building units provide commentary on aspects of text organization or logical structure or may express emotional reaction to something in the context.

Some examples of operator text building units include "Anyway"; "Wow"; "OK"; "As mentioned above"; "So"; and "However (when set off by commas or intonation). Content text building units are encoded in interjections, exclamations and logical connectives or phrases.

If the current text building unit is neither a content text building unit nor an operator text building unit, then the modifier determining circuit 160 is activated to determine if the current text building unit is a modifier text building unit. A modifier text building unit provides context setting information for information encoded further along in the text.

Some examples of modifier and content text building units include "having arrived home early, John ate lunch." The phrase, "having arrived home early" provides context for the content information that John ate lunch. Similarly, in the phrase, "By doing her homework on the bus, Mary had time for piano practice", "by doing her homework on the bus," is a modifier text building unit.

Normally modifier text building units are part of a sentence, although there are exceptions. For example in the phrase, "On the side of the housing for each drum: do X. Do Y. Do Z". The modifier text building unit "On the side of the housing for each drum" is not part of the sentence do "X"; rather this modifier text building unit is an independent unit that has scope over all three of the following sentences.

Modifier text building units are often encoded in the form of "(VERB)ing" or "having (VERB)ed", as well as in prepositional phrases specifying location, time, circumstance or manner. In the linear organization of English, modifier text building units are normally placed before a clause that they modify. The conventions of written English require these modifiers text building units to be separated by a comma from the rest of the sentence. This comma can be "heard" in reading the sentence aloud, where prosodic cues of intonation, phrasing and pausing indicate the break point.

It should be appreciated that the determination of type of each of the text building units discussed above is for ease of discussion and not limited to the order described. In particular, the determination of type for each of the text building units can be performed in any order. Once the text building units have been categorized by type by the content determining circuit 140, the operator determining circuit 150 and/or the modifier determining circuit 160, in various exemplary embodiments the structural representation of the discourse appropriate to visualizing the analyzed text may be constructed. Alternatively, in other exemplary embodiments, the structural representation of discourse may be created as the type of each text building unit is determined.

In the exemplary embodiment, a first text building unit is inserted as the root node or element of an open right discourse tree in the structural representation memory 132. The coordination determining circuit 170 is then activated to determine if a coordination relationship exists between the first text building unit, inserted as the root node of the discourse tree, and the next text building unit.

A coordination relationship exists between two text building units when a second text building unit continues a discourse activity that was previously begun or continued by a first text building unit. Coordinations are constructions where the text building units are combined in a list-like manner. Enumerations such as: "Paris is the capital of France. Vienna is the capital of Austria. Amsterdam is the capital of the Netherlands" are coordinations. Enumeration also includes narrative lists of event sequences such as "John came in. He walked into the kitchen. He put the groceries on the table." The coordinated units all have something in common and yet stand alone.

In this case, the text building unit is linked to the discourse tree with a coordination node. In particular, the first text node representing the first text building unit is replaced by a new coordination node and the first node becomes a leaf node of the new coordination node. The new coordination node links the first node representing the first text building unit as a left child node of the new coordination node into the discourse tree. A second text node representing the second text building unit to be added is then linked to the new coordination node as the right child node of the new coordination node. In some cases, a subsequent text building unit may extend the activity carried out by text building units already related to one another in the discourse tree as siblings under a coordination node. In this case, a third text node representing a third text building unit will be added under the existing coordination node as a new right child node. The second node becomes a middle child node. Additional nodes may be added in the same way. The coordination is not limited in the number of nodes it can relate as child nodes.

If the second text building unit is not related to the first text building unit as a coordination, the subordination determining circuit 180 is then activated to determine if a subordination relationship exists between the first text building unit, inserted as the root node of the discourse tree, and the second text building unit.

If the relation between the text building units is not a coordination relationship, the second text building unit is analyzed to determine if that text building unit elaborates upon or interrupts an active discourse in the discourse tree. A discourse is active if it has a relationship node or text node representing a text building unit that is located along the right edge of the discourse tree. If the second text building unit elaborates upon, or interrupts an active discourse, the relationship between the second text building unit and the previous text building unit is defined as a subordination relationship. In the Linguistic Discourse Model, subordinations relate a subordinating text building unit containing the actual content to a subordinated text building unit that does not add directly to the subordinating text building unit. For example, "Paris is the capital of France. It has a number of interesting museums." The subordinated text building unit "It has a number of interesting museums." does not add directly to the phrase stating that "Paris is the capital of France". Similarly, interruptions in the progression of discourse are categorized as subordinations. The phrases "John came in. Why do I tell you this?" contains a subordinated text building unit that does not add directly to the text building unit that states that John came in. Thus it does not add to the content of the subordinating node in the relationship.

In this case the first text node is replaced by a new subordination node and the first text node becomes a leaf node of the subordination node. The second text node representing the second text building unit is linked into the discourse tree as the right child node of the new subordination node.

The concept that subordinated text building units interrupt the discourse progression is significant, since it allows the Linguistic Discourse Model to capture and model the extent to which these interruptions are found in a written text. Information between parentheses, information about how to interpret information in the text or information about the formation of the text itself (such as, "see p. 5 below") are examples of interruptions found even in well-structured text. Since the subordinated text is by definition secondary to the main progression of the discourse, the subordinated text may be removed from consideration without affecting the main ideas of the text.

If the relationship between the text building units is not a coordination and not a subordination then the binary determining circuit 190 is activated to determine if a binary relationship exists between the first text building unit, inserted as the root node of the discourse tree and the second text building unit. In the Linguistic Discourse Model, binaries are constructed from two or more nodes that are specific for a particular language or for a specific genre within a particular language. The binary relationship is not deduced directly from the relationship between the text building units to be related by the binary relation. Instead, the binary relation is used to relate text building units making up question/answer pairs and document level genres such as manuals, recipes, novels and Frequently Asked Questions lists. In each of these types of documents, the top level structure is expressed as a binary relationship.

Therefore, if the relationship between the second text building unit and the first text building unit forming the right edge of the discourse tree is not a coordination and is not a subordination, then the second text building unit is classified as having a binary relationship with the first text building unit in the discourse tree. The first text node is replaced by a new binary node and the first text node becomes a left child node of the binary node. The second text node representing the second text building unit is then added as the right child node of the new binary node.

In some cases, additional subsequent text building units may be added as an additional nodes related under the binary to one another in the discourse tree as siblings under a binary node. In this case, a new third text node, for example representing a third text building unit, will be added under the existing binary node as a new right child node. The existing second node becomes a middle child node. Additional nodes may be added in the same way. The binary node is not limited in the number of nodes it can relate as child nodes.

For the purposes of discussion, the relation determining circuits 170–190 have been described in an order. However, it will be apparent that the circuits may be operated in any order or may operate in parallel.

In one exemplary embodiment using the Linguistic Discourse Model, the user progresses through the text, and the structural representation of discourse is an open right tree. Accordingly, the text nodes representing the text building units are added to the discourse tree only at the right edges of the discourse tree. As a result, the potential insertion points where the next text building unit can be added to the discourse tree can be easily determined and presented to the user. In various exemplary embodiments, the list of insertion points can be displayed to the user in the form of a constrained drop down selection box or any other form of display or prompt. Alternatively, the structural representation of discourse can be any representation providing visualization of the text.

Figure 2A:
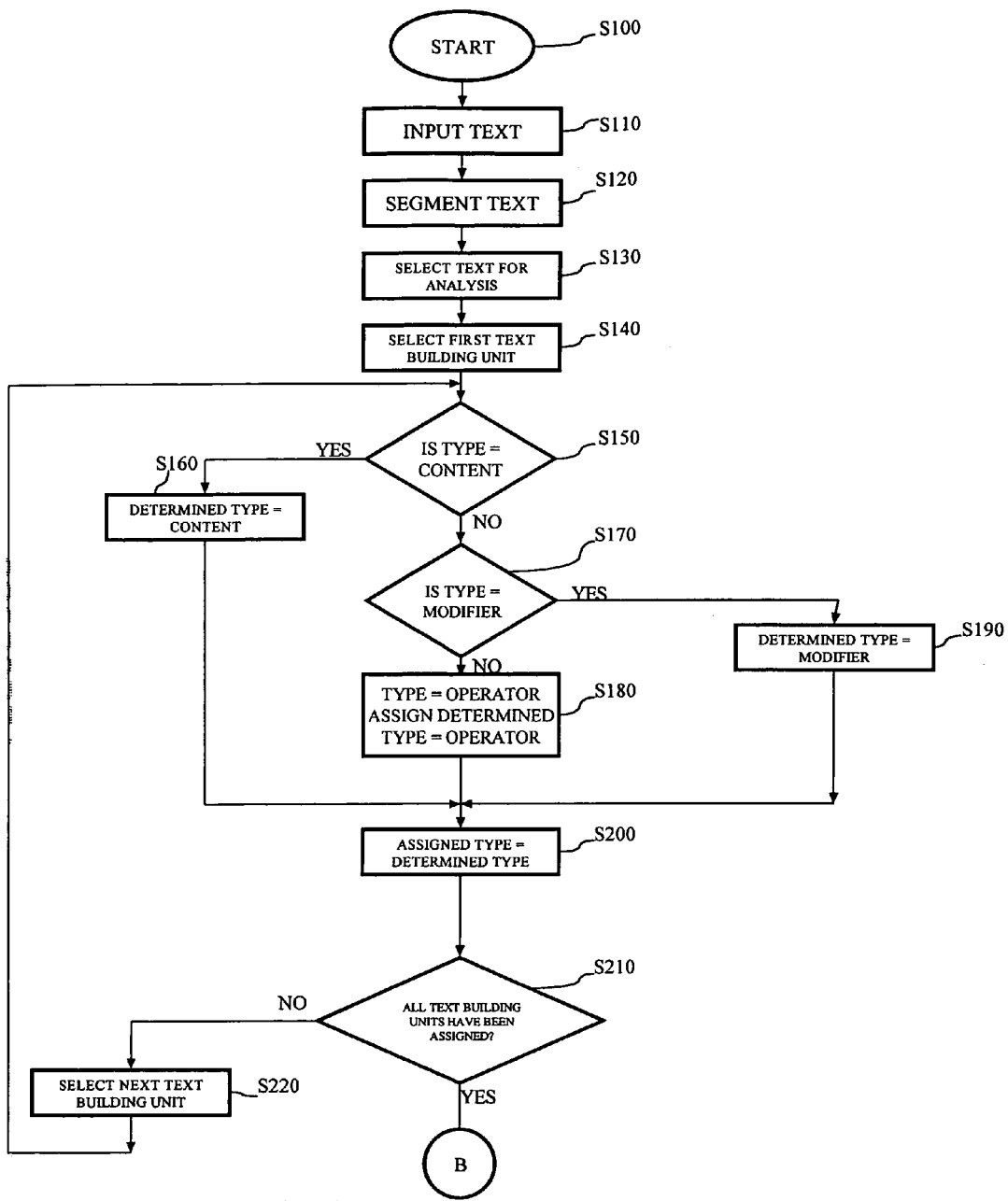
FIGS. 2A–2B is a flowchart outlining one exemplary embodiment of a method for analyzing a written text using the Linguistic Discourse Model according to this invention.
Figure 2B:
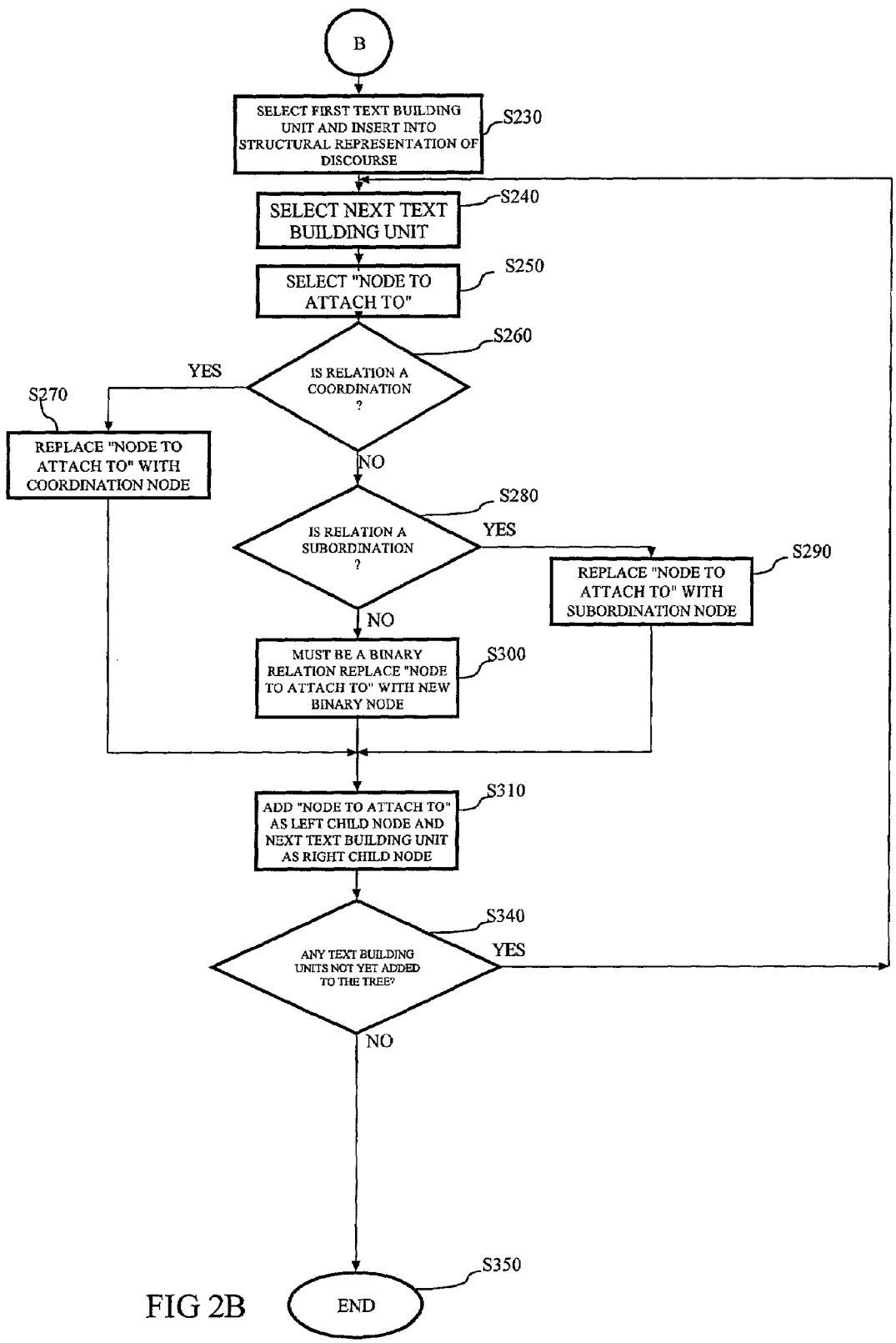

FIGS. 2A–2B show a flowchart outlining one exemplary embodiment of a method for analyzing a written text using the Linguistic Discourse Model according to this invention. Beginning at step S100, control continues to step S110, where the text to be analyzed with the Linguistic Discourse Model is input. Next, in step S120 the text is segmented into text building units. Text building units are the smallest unit of meaning in the Linguistic Discourse Model. A sentence may be formed by a single text building unit or may be formed by multiple text building units. As discussed above, the Linguistic Discourse Model can be used to analyze incomplete linguistic structures such as titles, dates, exclamations and sentence fragments. This is in contrast to other theories of discourse, which require complete well formed sentences in order to function. Then, in step S130 the portion of the segmented text to be analyzed is selected. Next, in step S140, the first text building unit is selected. Control then continues to step S150.

In step S150 a determination is made whether the text building unit selected is a content text building unit. If the text building unit is a content text building unit, control continues to step S160. Otherwise, if the type is not a content type text building unit, then control transfers to step S170. In step S160, the determined type is set to content. Control then jumps to step S200.

In contrast, in step S170, a determination is made if the text building unit is a modifier. If the text building unit is a modifier text building unit, control transfers to step S190. Otherwise, if the text building unit is not a modifier text building unit, then control continues to step S180. In step S180, the text building unit is determined to be an operator type text building unit and the determined type is set to operator. Control then jumps to step S200. In contrast, in step S190, the determined modifier is set to the modifier type. Control then continues to step S200.

In step S200, the assigned type is set equal to the determined type. Next, in step S210, a determination is made whether all of the text building units have been assigned. If so, control continues to step S230. Otherwise, control jumps to step S220. In step S220, the next text building unit is selected. Control then jumps back to step S150.

Once all of the text building units have been assigned a text building unit type, control jumps to step S230, where a first text building unit is selected and inserted into a structural representation of discourse as a root node. In the exemplary embodiment, the structural representation is a right open tree. Then, in step S240, a next text building unit is selected as the current text building unit. Next, in step S250, the node to attach to is selected from one of the nodes already in the tree. It will be apparent that, as the number of nodes linked into the structural representation of discourse increases, the number of nodes that may be selected to attach to also increases. As discussed above, the potential attachment points may be provided to a user in the form if a constrained list of nodes in the structural representation of discourse. Ambiguities with respect to the appropriate attachment point may be indicated by a characteristic such as color, font, size or any other characteristic of nodes in the structural representation of discourse. Certain texts may exploit ambiguity in the genre. For example, poetry writing is a form of writing that might be analyzed by with the Linguistic Discourse Model Analyzer 100. In poetry, the ambiguity may be used to communicate meaning at multiple levels. The Linguistic Discourse Model Analyzer 100 permits the analysis of these ambiguities through the use of visual cues and information encoding in the structural representation of discourse for the ambiguous nodes. After a node to attach to is selected from the list of valid attachment points, control continues to step S260.

In step S260, a determination is made whether the relation that exists between the node to attach to and the next selected text building unit is a coordination. If the relationship is determined to be a coordination, then control jumps to step S270 where the node to attach to is replaced with a coordination node. Control then jumps to step S310. If the determination step S260 does not indicate a coordination node, then control is transferred to step S280.

In step S280, a determination is made whether the relation is a subordination relationship. If the relationship is determined to be a subordination relationship, control is transferred to step S290 where the node to attach to is replaced with a subordination node. A jump in control is then made to step S310.

If the determination in step S280 indicates the relationship is not a subordination, then control is transferred to step S300. In step S300, the relationship is determined to be a binary relationship and the node to attach to is replaced with a new binary node. Control is then transferred to step S310.

In step S310, the first text building unit is added as left child of the newly added relation node determined in steps S260, S280 and S300. The selected node is added as the right child node of the newly added relation node. A jump is then made to step S340. In step S340 a determination is made whether any text building units have not yet been added to the discourse tree. If any text building units remain to be added to the tree, control jumps to step S240 and the next text building unit is selected. If no text building units remain to be added to the tree, control is transferred to step S300 and the processing ends.

Building the organizational structure of a text using the rules of the Linguistic Discourse Model theory of discourse, allows the user to gain a better understanding of the relationships between the text building units in any text. During building of the organizational tree, the user is prompted to understand how the text building units must interrelate in order to convey the desired information to a reader. This tree building process increases the user's understanding of the communicative aspects of the user's own writing and the writing of other people or the writing of particular genres. If an ambiguity exists regarding the appropriate insertion point for a text building unit, this ambiguity highlights the ambiguity the reader will experience with respect to the same unit of meaning represented by that next text building unit. The visualization of the structural representation of discourse created using the Linguistic Discourse Model, allows a user to quickly understand different types of writing styles such as for example, legal writing, poetry, fiction, expository writing or any type of writing or discourse.

It should be understood that the system and method for writing analysis using the Linguistic Discourse Model Analyzer 100 can be implemented on a programmed general purpose computer. However, the system and method for writing analysis using the Linguistic Discourse Model Analyzer 100 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of at least implementing a finite state machine that is in turn capable of implementing the flowchart shown in FIGS. 2A–2B, can be used to implement the system and method for writing analysis using the Linguistic Discourse Model Analyzer 100.

It will be apparent that the processing circuits or routines of the system and method for writing analysis using the Linguistic Discourse Model Analyzer 100 may be used in collaborative networked learning environments in which some or all of the system and method for writing analysis using the Linguistic Discourse Model Analyzer 100 components including the circuits or routines may be distributed throughout the network collaborative environment or located centrally. The environment may include web servers, application servers, or any other type of computer system. In general, the system may be used alone or in combination with any number of other general programmable or special purpose computers or components and in any type of environment including networked collaborative learning environments, client server environments and web based environments.

A formal definition of the Linguistic Discourse Model is described in following paragraphs.

Within the LDM, the set of discourse structure trees T are defined in terms basic categories C, the content units, O, the operators, M, the modifiers. To simplify writing the definition, trees are written in a linear form. For example, a tree consisting of a top node coord and child nodes $t_1$ to $t_n$ is written as coord($t_1 \ldots t_n$).

If c∈C, then c∈T

If c is a content unit, then c is a tree.

Examples of content units are "A man walked in" and "What is John's phone number".

If o∈O, then o∈T

If o is an operator unit, then o is a tree.

Examples of operator units are "Anyway", "Oh" and "Hello". Operators express information about the flow of the discourse.

If $t_1 \ldots t_n$∈T, then coord($t_1 \ldots t_n$)∈T

If $t_1 \ldots t_n$ are n trees, coord($t_1 \ldots t_n$) is a tree, called the coordination of $t_1 \ldots t_n$. An example of a coordination is "John came in through the backdoor. He put the groceries on the table". In this case a coordination relation exists between the two (content) units: they are equal elements in the narrative.

If $t_1, t_2$∈T, then sub($t_1, t_2$)∈T

If $t_1 \ldots t_2$ are trees, sub($t_1, t_2$) is a tree, called the subordination of $t_2$ to $t_1$. An example of a subordination is "Sue came in through the garage. She had forgotten her keys". In this case a subordination relation exists between the two (content) units: The second unit gives information about the first unit, namely what the reason is to come in through the garage. NOTE: subordinations are always between two nodes.

If $t_1 \ldots t_n$∈T, then bin($t_1 \ldots t_n$)∈T

If $t_1 \ldots t_n$ are trees, bin($t_1 \ldots t_n$) is a tree, called the binary combination of $t_1 \ldots t_n$. Examples of binaries are greetings "how are you doing? I'm doing fine!", and question/answer pairs "Do you want more coffee? Yes.".

If m∈M and t∈T, then bin(m,t)∈T

If m is a modifier unit and t is a tree, then bin(m,t) is a tree. An example of a modifier is "Every other Saturday in July" in "Every other Saturday in July, there is a concert in the park". Whereas a discourse consisting of only the unit "There is a concert in the park" would mean that there is a concert now (or on some moment in time that we happen to be discussing), the modified discourse "Every other Saturday in July, there is a concert in the park" means that there is a concert on every other Saturday in July. This illustrates how a modifier changes the context in which a unit is interpreted. Another example "Usually" in "Usually, Kim takes the bus to work and Robin takes the train". This illustrates that modifiers can modify non basic discourse units. A third example is "When Mary arrived" in "When Mary arrived, Ann was happy". This illustrates that modifiers can themselves contain prepositional content. NOTE: Modifiers are combined with their argument as a specific 2-place binary.

This definition gives all the ways that discourse trees are built up. A tree that consists of the coordination of two units $u_1$, and $u_2$, is written as coord($u_1,u_2$), a tree of two child nodes $u_1$ and $u_2$ and a top node coord. A third unit $u_3$ can be combined with this in a number of different ways.

1. It may continue the coordination, resulting in the tree coord($u_1, u_2, u_3$).

2. It may be subordinated to the node $u_2$, resulting in the tree coord($u_1$,sub($u_2,u_3$)).

3. It may be subordinated to the top node of the tree, resulting in the tree sub(coord($u_1,u_2$),$u_3$).

4. It may form a binary relationship with the node $u_2$, resulting in the tree coord($u_1$,bin($u_2,u_3$)).

5. It may form a binary relationship with the top node of the tree, in which case the tree is bin(coord($u_1,u_2$),$u_3$).

6. It may be coordinated with the node $u_2$, resulting in the tree coord($u_1$,coord($u_2,u_3$)).

7. It may be coordinated with the top node of the tree, resulting in the tree coord(coord($u_1,u_2$),$u_3$).

Modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A system of discourse analysis usable to analyze a text, comprising:
   a modifier determining circuit that determines if a unit of text provides context setting information that is necessary to the meaning of information encoded further along in a text;
   a operator determining circuit that determines if a unit of text provides at least one of: commentary on aspects of organization structure; logical structure; and expressing emotional reaction to a context;
   a content determining circuit that determines if a unit of text is a property of some entity and provides expression of at least one of: state; action; and belief;
   a coordination determining circuit that links a second unit of text to a first unit of text in a structural representation of discourse, where the second unit of text continues a discourse activity begun or continued by the first unit of text;
   a subordination determining circuit that links the second unit of text to the first unit of text in a structural representation of discourse if the second unit of text elaborates upon or interrupts the discourse activity begun by the first unit of text;
   a binary determining circuit that links the second unit of text to the first unit of text in a structural representation of discourse if the relationship between the first unit of text and the second unit of text is neither a coordination relationship nor a subordination relationship.

2. The system of discourse analysis of claim 1, wherein the system is used to analyze a written text.

3. The system of discourse analysis of claim 1, wherein the system is used to analyze a speech text converted from an utterance into a plurality of text units.

4. The system of discourse analysis of claim 1, wherein the system is used to analyze English text.

5. The system of discourse analysis of claim 1, wherein the system is used to analyze legal writing.

6. The system of discourse analysis of claim 1, wherein the system is used to analyze medical writing.

7. The system of discourse analysis of claim 1, wherein the system is used to analyze any type of communication.

8. The system of discourse analysis of claim 1, wherein the system is used to analyze any type of recorded communication.

9. The system of discourse analysis of claim 1, wherein the structural representation is a tree structure.

10. The system of discourse analysis of claim 9, wherein the tree structure is an open right tree structure.

11. The system of discourse analysis of claim 1, wherein the analysis is accomplished by comparing a structural representation of discourse for a specific genre to the structural representation of discourse for the text.

12. The system of discourse analysis of claim 1, wherein the analysis is accomplished by comparing visualizations of the structural representation of discourse for a document genre to the structural representation of discourse for the text.

13. A method of discourse analysis of a text, comprising:
   segmenting a text into a plurality of units of text;
   for each of the plurality of units of text:
      determining if that unit of text is a modifier providing context setting information that is necessary to the meaning of information encoded further along in the text,
      determining if that unit of text is an operator providing at least one of, commentary on aspects of organizational structure, logical structure, and expressing emotional reaction to a context, and
      determining if that unit of text is a content unit providing, expression of at least one of state, action and belief, that is a property of some entity;
   inserting a first unit of text into a structural representation of discourse as a root node;
   for each one of the plurality of units of text not yet inserted into the tree:
      selecting that unit of text as a current unit of text,
      selecting that node in the structural representation of discourse to attach the current unit of text to;
      if the current unit of text continues a discourse activity begun or continued by the first node in the structural representation of discourse; if the current unit of text is determined to continue the discourse: replacing the selected node with a coordination node,
      adding the selected node as left child node of the coordination node, and adding a new node representing the current unit of text as a right child node of the coordination node;
      if the next unit of text elaborates upon or interrupts the discourse activity begun by the first node in the structural representation of discourse, replace first node with a subordination node, add first node as left child node, add selected next unit of text as right child node;
      if the relationship between the next unit of text and the first node in the structural representation of discourse is not a coordination and not a subordination, replace the first node with a binary node, add first node as the left child node, add the next unit of text as the right child node.

14. The discourse analysis method of claim 13, wherein the method is used to analyze writing.

15. The discourse analysis method of claim 13, wherein the method is used to analyze speech converted to at least a first unit of text unit and a second unit of text unit.

16. The discourse analysis method of claim 13, wherein the method is used to analyze English text.

17. The discourse analysis method of claim 13, wherein the method is used to analyze texts in a language that is not English.

18. The discourse analysis method of claim 13, wherein the method is used to analyze legal writing.

19. The discourse analysis method of claim 13, wherein the method is used to analyze medical writing.

20. The discourse analysis method of claim 13, wherein the method is used to analyze any type of communication.

21. The discourse analysis method of claim 13, wherein the method is used to analyze any type of recorded communication.

22. The discourse analysis method of claim 13, wherein the structural representation is a tree structure.

23. The discourse analysis method of claim 13, wherein the structural representation is an open right tree structure.

24. The discourse analysis method of claim 13, wherein the analysis is accomplished by comparing a structural representation of discourse genre to the structural representation of discourse of the text.

25. The discourse analysis method of claim 13, wherein the analysis is accomplished by comparing visualizations of a structural representation of discourse genre to visualizations of the structural representation of discourse of the text.

* * * * *